(12) United States Patent
Hoshino et al.

(10) Patent No.: US 11,097,722 B2
(45) Date of Patent: Aug. 24, 2021

(54) ELECTRIC VEHICLE

(71) Applicant: HONDA MOTOR CO., LTD., Tokyo (JP)

(72) Inventors: Daisuke Hoshino, Wako (JP); Yutaka Arimura, Wako (JP); Tatsuya Ohzu, Wako (JP); Shingo Soma, Wako (JP); Yosuke Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 16/283,310

(22) Filed: Feb. 22, 2019

(65) Prior Publication Data

US 2019/0263387 A1 Aug. 29, 2019

(30) Foreign Application Priority Data

Feb. 23, 2018 (JP) .............................. JP2018-030910

(51) Int. Cl.
*B60W 20/40* (2016.01)
*B60K 6/40* (2007.10)
*B60W 50/00* (2006.01)
*B60W 10/08* (2006.01)
(Continued)

(52) U.S. Cl.
CPC ............... *B60W 20/40* (2013.01); *B60K 6/36* (2013.01); *B60K 6/387* (2013.01); *B60K 6/40* (2013.01);
(Continued)

(58) Field of Classification Search
CPC ...... B60W 20/40; B60W 50/00; B60W 10/08; B60W 10/02; B60W 2520/10;
(Continued)

(56) References Cited

U.S. PATENT DOCUMENTS 8,417,427 B2  4/2013 Stridsberg
8,587,237 B2 11/2013 Kobayashi et al.
(Continued)

FOREIGN PATENT DOCUMENTS

DE  112011102170 T5  3/2013
JP  S62-19099 U      2/1987
(Continued)

OTHER PUBLICATIONS

Office Action dated Jul. 17, 2020 issued over the corresponding German Patent Application No. 102019202398.3 with the English translation thereof.

(Continued)

*Primary Examiner* — Brian P Sweeney
(74) *Attorney, Agent, or Firm* — Carrier Blackman & Associates, P.C.; Joseph P. Carrier; Jeffrey T. Gedeon (57) ABSTRACT

An electric vehicle includes a second rotating electric machine; a first transmission path configured to transmit force generated by the second rotating electric machine to a wheel; a first clutch that is arranged in the first transmission path and configured to switch between a connected state and a disconnected state between the second rotating electric machine and the wheel; and an ECU configured to control the second rotating electric machine and the first clutch. In the electric vehicle, a torque sensor is arranged between the first clutch and the wheel in the first transmission path.

8 Claims, 9 Drawing Sheets

(51) Int. Cl.
  *B60W 10/02* (2006.01)
  *B60K 6/387* (2007.10)
  *B60K 6/36* (2007.10)
(52) U.S. Cl.
  CPC ............ *B60W 10/02* (2013.01); *B60W 10/08* (2013.01); *B60W 50/00* (2013.01); *B60W 2050/0026* (2013.01); *B60W 2510/08* (2013.01); *B60W 2510/083* (2013.01); *B60W 2520/10* (2013.01); *B60W 2710/083* (2013.01); *B60Y 2200/92* (2013.01)
(58) Field of Classification Search
  CPC ....... B60W 2710/083; B60W 2510/08; B60W 2510/083; B60W 2050/0026; B60W 2030/206; B60W 2510/081; B60W 2510/084; B60W 2420/22; B60W 30/20; B60K 6/40; B60K 6/387; B60K 6/36; B60K 6/442; B60Y 2200/92; Y02T 10/72; Y02T 10/62; B60L 15/20
  See application file for complete search history.

(56) References Cited

U.S. PATENT DOCUMENTS

| | | | |
|---|---|---|---|
| 10,336,176 B2 | 7/2019 | Tsukamoto | |
| 2009/0048747 A1* | 2/2009 | Stridsberg | B60W 10/11 701/55 |
| 2009/0266179 A1 | 10/2009 | Oniwa et al. | |
| 2012/0059544 A1 | 3/2012 | Kinoshita et al. | |
| 2017/0158043 A1* | 6/2017 | Tsukamoto | B60K 6/442 |

FOREIGN PATENT DOCUMENTS

| | | |
|---|---|---|
| JP | H07-336808 A | 12/1995 |
| JP | H11-005537 A | 1/1999 |
| JP | 2009-515769 A | 4/2009 |
| JP | 2009-264812 A | 11/2009 |
| JP | 2014-100055 A | 5/2014 |
| JP | 2017-100590 A | 6/2017 |

OTHER PUBLICATIONS

Search Report dated Jul. 17, 2020 issued over the corresponding German Patent Application No. 102019202398.3 with the English translation thereof.

Office Action dated Dec. 3, 2019 issued over the corresponding Japanese Patent Application No. 2018-030910 with the English translation thereof.

* cited by examiner

ELECTRIC VEHICLE

CROSS-REFERENCE TO RELATED APPLICATION

This application is based upon and claims the benefit of priority from Japanese Patent Application No. 2018-030910 filed on Feb. 23, 2018, the contents of which are incorporated herein by reference.

BACKGROUND OF THE INVENTION

Field of the Invention

The present invention relates to an electric vehicle including a drive motor that drives the wheels.

Description of the Related Art

Japanese Laid-Open Patent Publication No. 2014-100055 describes a configuration in which a torque sensor is provided to each wheel, for example, to actually measure wheel torque input as disturbance.

SUMMARY OF THE INVENTION

However, for drive motors mounted in an electric vehicle, an electric motor (interior permanent magnet motor; IPM motor) in which a magnet is embedded is mainstream. IPM motors have characteristics such as being advantageous for mechanical strength at high rotations, having a significant field weakening effect, and the like, but on the other hand, IPM motors have problems that there are large changes in the magnetic flux density of iron parts between the magnets and there are also large torque ripples.

Conventionally, torque ripples are predicted, for example, using a high-frequency superimposition map, according to the rotational angle θtrc of the drive motor, and a correction is performed, but due to the zero-point adjustment error or the like of the drive motor, the above correction cannot be fully predicted, and residual torque ripples occur.

The above Japanese Laid-Open Patent Publication No. 2014-100055 describes a configuration in which a torque sensor is provided to each wheel, for example, to actually measure wheel torque input as disturbance. However, when external force or torque (i.e. disturbance) acts on the wheels during travel, due to unevenness of the road surface or the like, the wheel torque input as disturbance is torque that is transferred to the vehicle body through the wheels and suspension (omitted from the drawings) by this external force or the like, and there is no description relating to torque ripples of an electric motor.

The present invention takes the above problems into consideration, and it is an object of the present invention to provide an electric vehicle that can suppress, with a simple configuration, torque ripples that accompany rotational drive of a drive motor.

[1] The electric vehicle according to an aspect of the present embodiment includes a drive motor; a transmission path configured to transmit force generated by the drive motor to a wheel; a switching apparatus that is arranged in the transmission path and configured to switch between a connected state and a disconnected state between the drive motor and the wheel; and a control apparatus configured to control the drive motor and the switching apparatus, wherein a torque sensor is arranged between the switching apparatus and the wheel in the transmission path.

In this way, it is possible to acquire the torque occurring between the switching apparatus and the wheel (e.g., in the output shaft) in the transmission path directly through the torque sensor, and therefore the torque transmitted to the wheel can be controlled to be constant and smooth creeping travel (travel at a constant velocity), for example, can be realized.

[2] The aspect of the present embodiment may further include a torque ripple suppressing unit, and the torque ripple suppressing unit may include a torque ripple component acquiring unit configured to acquire a torque ripple component based on a torque command value for the drive motor and a torque detected by the torque sensor; and a torque correcting unit configured to correct the torque generated from the drive motor by suppressing the torque ripple component from the torque command value.

There is no need to use a high frequency superimposition map or the like to predict the torque ripple according to the rotational angle of the drive motor, and therefore it is possible to simplify the configuration and to simplify the information processing. Furthermore, it is possible to correct deviation of the torque due to angle errors of the drive motor, based on the zero-point adjustment error or the like of the drive motor, for example. Yet further, it is possible to suppress deviation of the high-frequency superimposition map described above due to the temperature characteristics of the drive motor.

In addition, by detecting torsional vibration caused by the input from the driving wheel with the torque sensor, it is possible to correct the torque generated from the drive motor such that the torsional vibrational component is also suppressed along with the torque ripple component.

[3] In the aspect of the present embodiment, the torque ripple suppressing unit further includes a map in which torque ripple components corresponding to rotational angles of the drive motor are registered; and an output selecting unit configured to select between an output based on the torque sensor and an output based on the map.

As an example, when the torque sensor is normal, the output based on the torque sensor is selected by the output selecting unit, and when the torque sensor is not normal due to experiencing a malfunction or the like, the output based on the map is selected by the output selecting unit. As described above, in the output based on the map, there is a concern about torque deviation due to an angular error of the drive motor or torque deviation due to the temperature characteristics of the drive motor, but it is possible for this output to function as a failsafe while the malfunctioning torque sensor is being replaced with a normal torque sensor.

[4] In the aspect of the present embodiment, the torque ripple suppressing unit operates when vehicle velocity is in a low velocity region.

Since high frequencies are easily attenuated, it is unlikely that the driver or passenger will feel these frequencies, but low frequencies are easily transmitted to the driver or passenger. Accordingly, the angular frequency of the drive motor becomes high when the vehicle velocity V is in a high velocity region, and therefore vibration, sound, and the like of the drive motor is unlikely to be transmitted to the driver or passenger. Since the angular frequency of the drive motor becomes low when the vehicle velocity V is in the low velocity region, it becomes easier for the vibration, sound, and the like of the drive motor to be transmitted to the driver or passenger. Therefore, by having the torque ripple suppressing unit operate when the vehicle velocity V is in the low velocity region, it is possible to realize smooth creeping travel (travel at a constant velocity) and also to make the information processing more efficient, since the torque ripple suppressing unit no longer needs to operate constantly.

[5] In the aspect of the present embodiment, the torque ripple suppressing unit operates when vehicle velocity satisfies Fa≤f/2, where Fa is a frequency of an integer-multiple-order wave of an electrical angle of the drive motor relative to the vehicle velocity and f is a control frequency of the drive motor.

By having the torque ripple suppressing unit operate when the vehicle velocity V is in the low velocity region, i.e., when the vehicle velocity satisfies Fa≤f/2, it is possible to realize smooth creeping travel (travel at a constant velocity) and also to make the signal processing and information processing more efficient, since the torque ripple suppressing unit no longer needs to operate constantly.

According to the present embodiment, it is possible to suppress, with a simple configuration, torque ripples that accompany rotational drive of a drive motor.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes embodiments of an electric vehicle according to the present embodiment, while referencing FIGS. 1 to 9.

A. Present Embodiment

<A-1. Configuration of the Present Embodiment>
[A-1-1. Overall Configuration]

Figure 1:
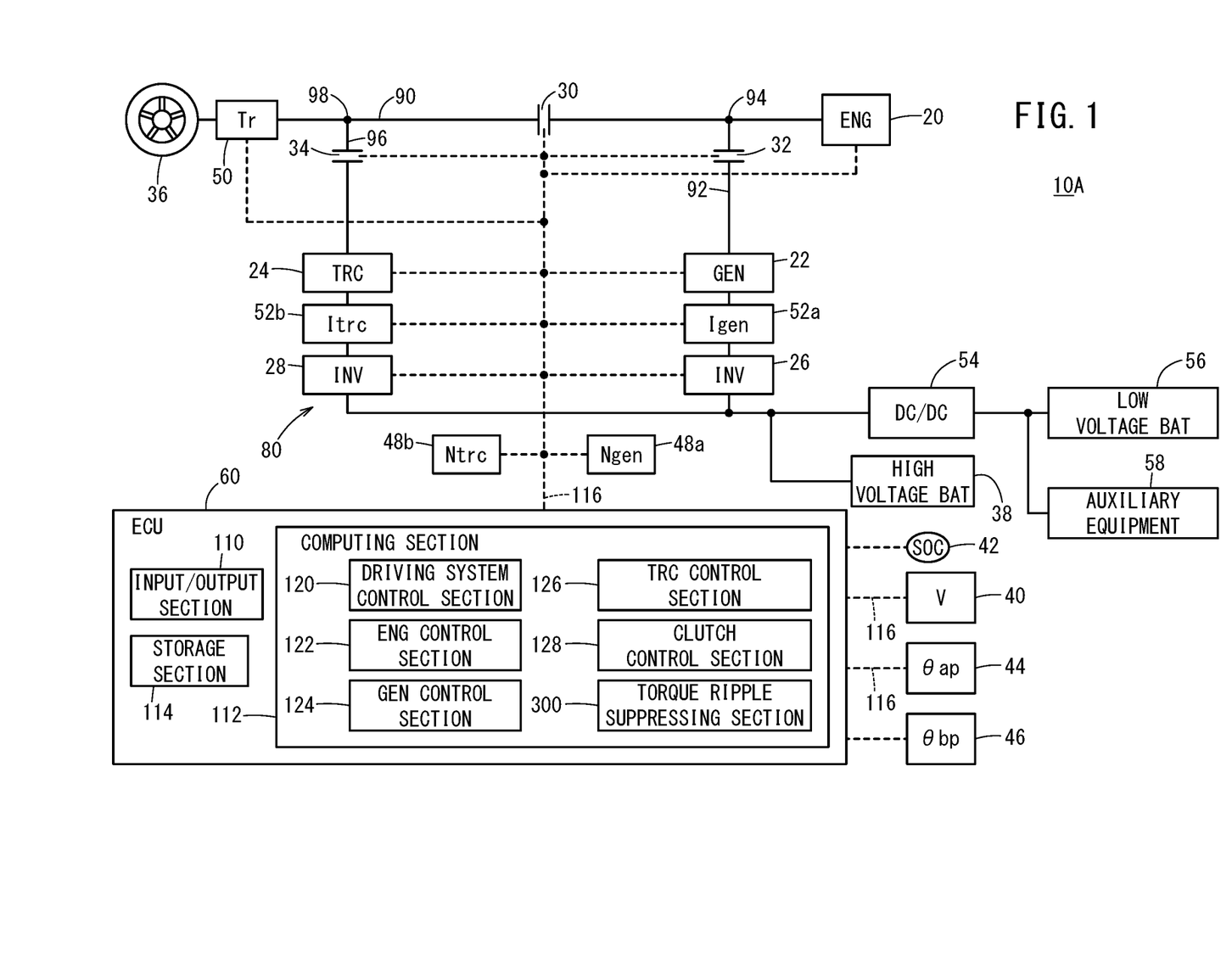
FIG. 1 is a schematic configurational diagram of an electric vehicle (first electric vehicle) according to a first embodiment.

FIG. 1 is a schematic configurational diagram of an electric vehicle according to a first embodiment (referred to below as a "first electric vehicle 10A"). The first electric vehicle 10A is a so-called hybrid vehicle. The first electric vehicle 10A includes an engine 20, a first rotating electric machine 22, a second rotating electric machine 24 (drive motor), a first inverter 26, a second inverter 28, a first clutch 30, a second clutch 32, a third clutch 34, a wheel 36, a high voltage battery 38, a vehicle velocity sensor 40, a SOC sensor 42, an AP manipulation amount sensor 44, a BP manipulation amount sensor 46, rotational velocity sensors 48a and 48b, a torque sensor 50, current sensors 52a and 52b, a step-down converter 54, a low voltage battery 56, electric auxiliary equipment 58, and an electronic control unit 60 (referred to below as an "ECU 60").

Below, the engine 20, the first rotating electric machine 22, the second rotating electric machine 24, the first clutch 30, the second clutch 32, and the third clutch 34 are referred to collectively as a drive system 80. This drive system 80 is provided for each wheel 36, e.g., four drive systems 80 are provided if there are four wheels, and two drive systems 80 are provided if there are two wheels. It should be noted that two wheels 36 may be linked via a differential apparatus (not shown in the drawings).

Furthermore, the force transmission path connecting the engine 20 and the wheel 36 is referred to as a first transmission path 90. The first transmission path 90 transmits the force Feng generated by the engine 20 to the wheel 36. Furthermore, a force transmission path that connects the first rotating electric machine 22 and a first branch point 94, which is on the engine 20 side of the first clutch 30 in the first transmission path 90, is referred to as the second transmission path 92. Yet further, a force transmission path connecting the second rotating electric machine 24 and a second branch point 98, which is on the wheel 36 side of the first clutch 30 in the first transmission path 90, is referred to as a third transmission path 96.

[A-1-2. Engine 20]

The engine 20 generates the force Feng as a first drive source for travel of the first electric vehicle 10A, and supplies this force Feng to the wheel 36 (driving wheel). Furthermore, the engine 20 operates the first rotating electric machine 22 with the force Feng to thereby generate electric power. Below, "ENG" or "eng" is appended to parameters relating to the engine 20. In FIG. 1 and the like, the engine 20 is indicated by "ENG".

[A-1-3. First Rotating Electric Machine 22]

The first rotating electric machine 22 is a three-phase AC (alternating-current) brushless type, and functions as a generator that generates electric power with the force Feng from the engine 20. The electric power Pgen generated by the first rotating electric machine 22 is supplied via the first inverter 26 to the high voltage battery 38 (referred to below as the "battery 38" or "BAT 38") or the second rotating electric machine 24, or to the electric auxiliary equipment 58. The first rotating electric machine 22 is an interior permanent magnet synchronous motor (IPMSM). The first rotating electric machine 22 includes a stator and a rotor, not shown in the drawings.

Below, the first rotating electric machine 22 is also referred to as a generator 22. The first rotating electric machine 22 may function as a traction motor, in addition to or instead of functioning as a generator. Below, "GEN" or "gen" is appended to parameters relating to the generator 22. Furthermore, In FIG. 1 and the like, the generator 22 is indicated by "GEN". The generator 22 can be used as the stator motor of the engine 20.

[A-1-4. Second Rotating Electric Machine 24]

The second rotating electric machine 24 is a three-phase AC brushless type that generates a force Ftrc serving as a second drive source for travel of the first electric vehicle 10A and supplies this force Ftrc to the wheel 36 (driving wheel) side. In other words, the second rotating electric machine 24 functions as a traction motor that is driven by one or both of the power Pbat from the high voltage battery 38 and the power Pgen from the generator 22. Furthermore, the second rotating electric machine 24 performs regeneration when the first electric vehicle 10A brakes, and supplies the battery 38 with regeneration power Preg via a second invertor, not shown in the drawings. The regeneration power Preg may be supplied to the electric auxiliary equipment 58 (also referred to below as "auxiliary equipment 58"). In the same manner as the generator 22, the second rotating electric machine 24 is an interior permanent magnet synchronous motor (IPMSM). The second rotating electric machine 24 includes a stator and a rotor, not shown in the drawings. Below, the second rotating electric machine 24 is also referred to as a traction motor 24 or TRC motor 24.

The second rotating electric machine 24 may function as a generator, in addition to or instead of functioning as a traction motor. Below, "TRC" or "trc" is appended to parameters relating to the traction motor 24. Furthermore, in FIG. 1 and the like, the traction motor 24 is indicated by "TRC".

[A-1-5. First Inverter 26 and Second Inverter 28]

The first inverter 26 and the second inverter 28 have three-phase full bridge configurations, and perform DC/AC conversion. In other words, the first inverter 26 and the second inverter 28 convert the direct current from the high voltage battery 38 into three-phase alternating current, and supply the three-phase alternating current to the first rotating electric machine 22 and the second rotating electric machine 24. Furthermore, the first inverter 26 and the second inverter 28 supply the battery 38 with the direct current resulting from the AC/DC conversion performed on the alternating current accompanying the power generation operation (or regeneration operation) of the first rotating electric machine 22 and the second rotating electric machine 24.

[A-1-6. First Clutch 30, Second Clutch 32, and Third Clutch 34]

The first clutch 30 (first switching apparatus) is arranged in the first transmission path 90, and switches between a connected state and a disconnected state between the engine 20 and the wheel 36, based on instructions from the ECU 60. Below, the first clutch 30 is also referred to as an ENG clutch 30 or a COM clutch 30. Here, "COM" means that the clutch is "common" to the engine 20 and the generator 22.

The second clutch 32 (second switching apparatus) is arranged in the second transmission path 92, and switches between a connected state and a disconnected state between the first transmission path 90 and the generator 22, based on instructions from the ECU 60. Below, the second clutch 32 is also referred to as a GEN clutch 32.

The third clutch 34 (third switching apparatus) is arranged in the third transmission path 96, and switches between a connected state and a disconnected state between the first transmission path 90 and the traction motor 24, based on instructions from the ECU 60. Below, the third clutch 34 is also referred to as a TRC clutch 34.

[A-1-7. High Voltage Battery 38]

The high voltage battery 38 is a power storage apparatus (energy storage) that includes a plurality of battery cells and is capable of outputting a high voltage (hundreds of volts), and can be a lithium ion secondary battery, a nickel hydrogen secondary battery, an all solid state battery, or the like, for example. A power storage device such as a capacitor can also be used, instead of or in addition to the battery 38.

[A-1-8. Various Sensors]

The vehicle velocity sensor 40 detects the vehicle velocity V [km/h] of the first electric vehicle 10A, and transmits this vehicle velocity to the ECU 60. The SOC sensor 42 is formed by a current sensor or the like, not shown in the drawings, detects the state of charge (SOC) of the battery 38, and transmits this SOC to the ECU 60.

The AP manipulation amount sensor 44 detects the depression amount (AP manipulation amount θap) [deg] or [%] of an acceleration pedal, not shown in the drawings, from an original position, and transmits this depression amount to the ECU 60. The BP manipulation amount sensor 46 detects the depression amount (BP manipulation amount θbp) [deg] or [%] of a brake pedal, not shown in the drawings, from an original position, and transmits this depression amount to the ECU 60.

The rotational velocity sensor 48a detects the rotational velocity Ngen [rpm] of the generator 22 as a number of rotations per unit time, and transmits this rotational velocity Ngen to the ECU 60. The rotational velocity sensor 48b detects the rotational velocity Ntrc [rpm] of the traction motor 24 as a number of rotations per unit time, and transmits this rotational velocity Ntrc to the ECU 60.

The current sensor 52a detects the current Igen (also referred to below as the "GEN current Igen") flowing between the generator 22 and the first inverter 26. The current sensor 52b detects the current Itrc (also referred to below as the "TRC current Itrc") flowing between the traction motor 24 and the second inverter 28.

[A-1-9. Step-Down Converter 54, Low Voltage Battery 56, and Electric Auxiliary Equipment 58]

The step-down converter 54 steps down the battery voltage Vbat, the power generation voltage Vgen, or the regeneration voltage Vreg, and supplies this voltage to the electric auxiliary equipment 58. The battery voltage Vbat is the output voltage of the battery 38, the power generation voltage Vgen is the output voltage of the generator 22 when generating electric power, and the regeneration voltage Vreg is the output voltage of the traction motor 24 during regeneration. The auxiliary equipment 58 includes lights, air conditioning equipment, a navigation apparatus, an audio apparatus, and the like, for example.

[A-1-10. ECU 60]

The ECU 60 is a control apparatus (or control circuit) that controls the entire drive system 80, and includes an input/output section 110, a computing section 112, and a storage section 114. The input/output section 110 performs input and output of signals with each section of the first electric vehicle 10A, via signal lines 116 (communication lines). The input/output section 110 includes an A/D conversion circuit, not shown in the drawings, that converts analog signals input thereto into digital signals.

The computing section 112 includes a central processing unit (CPU) and operates according to the execution of a program stored in the storage section 114. A portion of the functions performed by the computing section 112 can be realized using a logic IC (Integrated Circuit). The program may be supplied from the outside, via a wireless communication apparatus (mobile telephone, smart phone, or the like), not shown in the drawings. The computing section 112 can configure a portion of the program with hardware (circuit components).

As shown in FIG. 1, the computing section 112 includes a driving system control section 120, an engine control section 122, a generator control section 124, a traction motor control section 126, and a clutch control section 128.

The driving system control section 120 controls driving systems of the first electric vehicle 10A. Here, the driving systems include a driving system using the engine 20, a driving system using the traction motor 24, and a driving system using the engine 20 and the traction motor 24. The details of this are described further below, with reference to FIG. 2 and the like.

The engine control section 122 (also referred to below as the "ENG control section 122") controls the engine 20 based on instructions from the driving system control section 120. The generator control section 124 (also referred to below as the "GEN control section 124") controls the generator 22 based on instructions from the driving system control section 120.

The traction motor control section 126 (also referred to below as the "TRC control section 126") controls the traction motor 24 based on instructions from the driving system control section 120. The clutch control section 128 controls the first to third clutches 30, 32, and 34 based on instructions from the driving system control section 120.

The storage section 114 stores programs and data used by the computing section 112, and includes a random access memory (RAM). A volatile memory such as a register and a non-volatile memory such as a flash memory can be used as the RAM. Furthermore, the storage section 114 may include a read only memory (ROM), in addition to the RAM.

Figure 2:
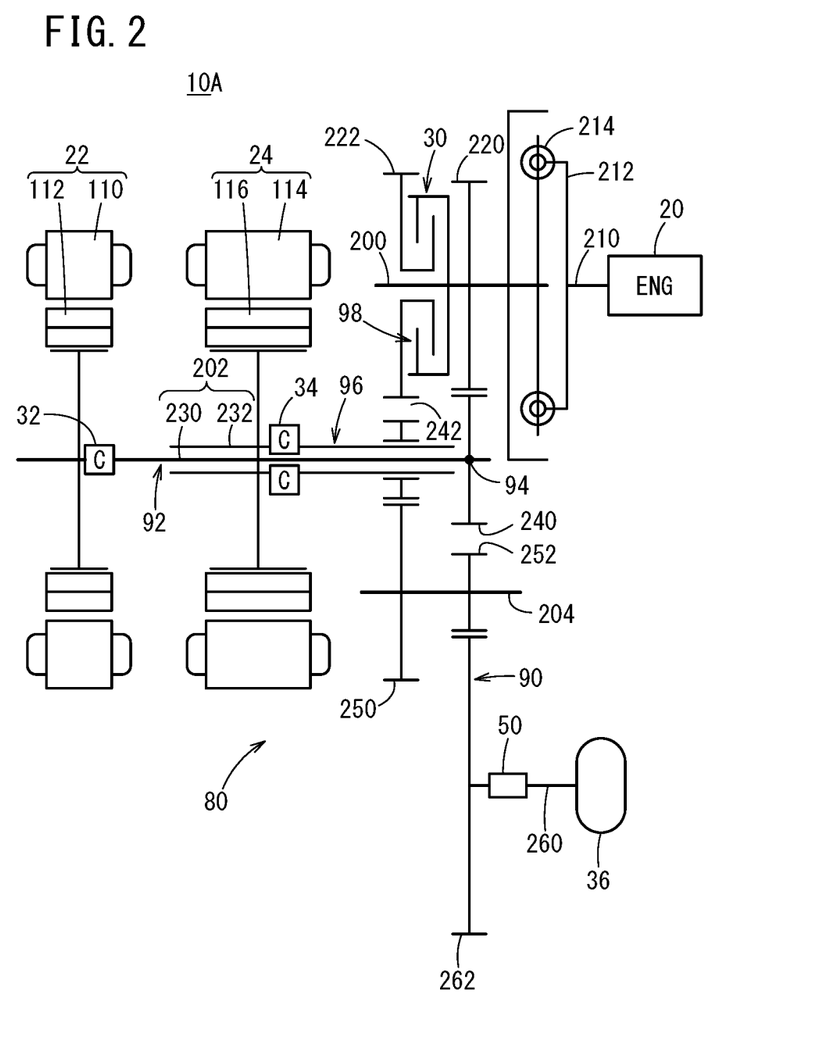
FIG. 2 is a simplified view of a mechanical linking relationship of the drive system of the first electric vehicle.

On the other hand, as shown in FIG. 2, the drive system 80 includes an engine shaft 200, a motor generator shaft 202, and a counter shaft 204. The engine 20 is connected to the engine shaft 200, via a crank shaft 210, a drive plate 212, and a damper 214. A first engine shaft gear 220, the ENG clutch 30, and a second engine shaft gear 222 are arranged on the engine shaft 200.

The motor generator shaft 202 includes an inner circumference shaft 230 and an outer circumference shaft 232. An inner circumference shaft gear 240 that engages with the first engine shaft gear 220 is formed on the inner circumference shaft 230. Therefore, the inner circumference shaft 230 rotates along with the rotation of the engine shaft 200, to drive the generator 22. The GEN clutch 32 is arranged on the inner circumference shaft 230. It should be noted that the inner circumference shaft 230 is connected to the engine shaft 200, regardless of the connection state of the ENG clutch 30.

The outer circumference shaft 232 of the motor generator shaft 202 is a hollow member arranged around the inner circumference shaft 230. An outer circumference shaft gear 242 that engages with the second engine shaft gear 222 is formed on the outer circumference shaft 232, and the traction motor 24 is connected to the outer circumference shaft 232.

The counter shaft 204 is arranged parallel to the engine shaft 200 and the motor generator shaft 202. The counter shaft 204 is provided with a first output shaft gear 250 that engages with the outer circumference shaft gear 242 and a second output shaft gear 252 that engages with the output gear 262 of the output shaft 260.

Accordingly, when the ENG clutch 30 is ON (connected state), so-called parallel traction, which transfers both the force Feng of the engine 20 and the force Ftrc of the traction motor 24 to the output shaft 260, becomes possible.

Furthermore, when the ENG clutch 30 is in OFF (disconnected state), the engine shaft 200 is not linked to the outer circumference shaft 232 and the output shaft 260. In this case, the force Feng of the engine 20 is transmitted only to the generator 22. Therefore, so-called series traction, in which the generator 22 generates electric power according to the force Feng of the engine 20 and the electric power obtained from this power generation is supplied to the traction motor 24, becomes possible.

<A-2. Travel Modes>
[A-2-1. General Outline]

Figure 3:
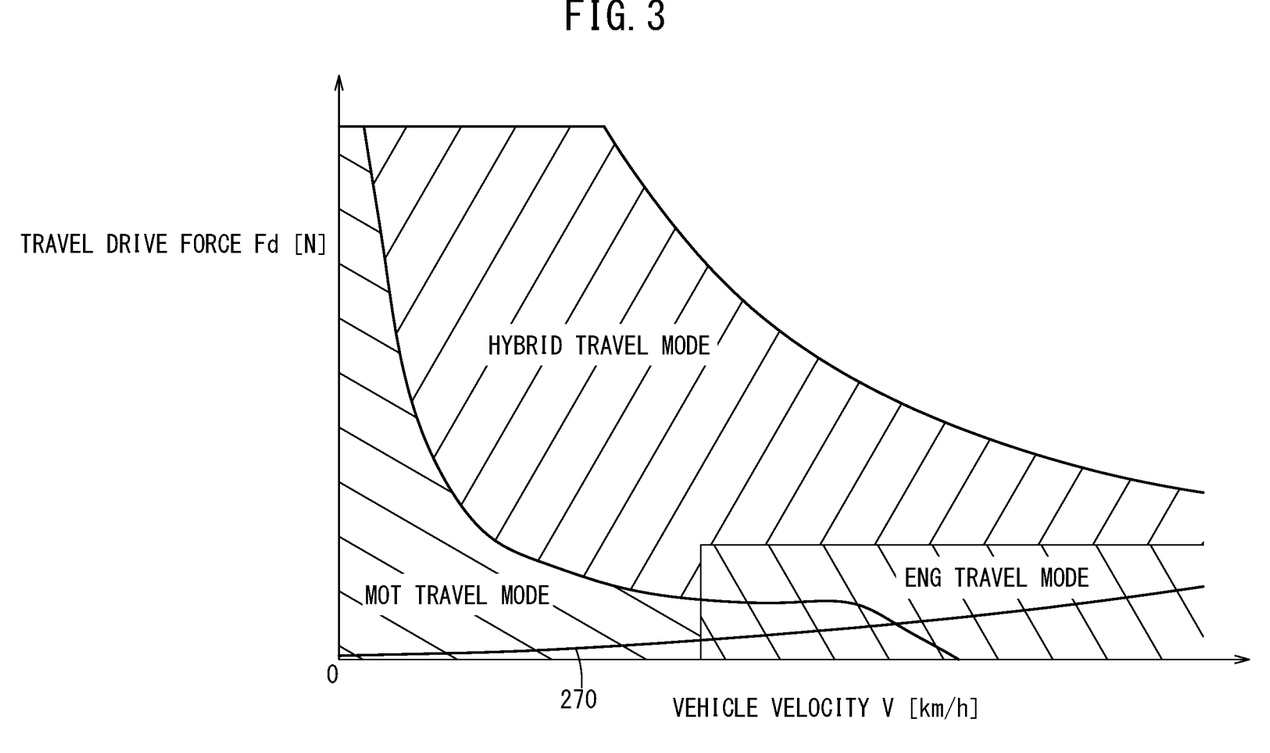
FIG. 3 is a diagram describing a travel mode selection method used by the first electric vehicle.

FIG. 3 is a diagram describing a travel mode selection method used by the first electric vehicle 10A. An MOT travel mode, a hybrid travel mode, an ENG travel mode, and a regeneration mode are used by the first electric vehicle 10A. As shown in FIG. 3, the MOT travel mode, the hybrid travel mode, and the ENG travel mode are mainly selected according to the vehicle velocity V and the travel drive force Fd of the first electric vehicle 10A.

The travel drive force Fd may be any one of an actual measured value, an estimated value, and a desired value. Furthermore, the units of the travel drive force Fd here are "newtons (N)", but may instead be "Nm" for torque. If the travel drive force Fd is a desired value, the ECU 60 calculates the travel drive force Fd using the vehicle velocity V, the AP manipulation amount θap, the BP manipulation amount θbp, and the like.

Furthermore, FIG. 3 shows a travel resistance line 270. The travel resistance line 270 indicates the resistance Rt (also referred to below as the "travel resistance Rt") received when the first electric vehicle 10A travels on specific type of travelled road (e.g., a flat asphalt road). When the acceleration of the first electric vehicle 10A caused by the travel drive force Fd is balanced with the deceleration caused by the travel resistance Rt, the first electric vehicle 10A travels at a constant velocity. In other words, in order for the first electric vehicle 10A to travel with a constant velocity at a prescribed vehicle velocity V, the first electric vehicle 10A should travel with a travel drive force Fd corresponding to this prescribed vehicle velocity V on the travel resistance line 270.

[A-2-2. MOT Travel Mode]

The MOT travel mode is a mode in which the traction motor 24 drives the first electric vehicle 10A mainly using the electric power of the high voltage battery 38. As shown in FIG. 3, the MOT travel mode is used when travelling at low velocity or medium velocity, when travelling by inertia (coasting) (while charging), and when travelling by inertia (without charging). Furthermore, the MOT travel mode includes control patterns PA11, PA12, and PA13.

The control pattern PA11 (rotating electric machine cruise travel mode) sets the ENG clutch 30 and the GEN clutch 32 to a disconnected state (OFF) and sets the TRC clutch 34 to a connected state (ON). The control pattern PA11 is used, for example, when traveling at a low or medium velocity (including during low velocity cruising and medium velocity cruising).

The control pattern PA12 sets the ENG clutch 30, the GEN clutch 32, and the TRC clutch 34 to be ON. The control pattern PA12 is used during low-velocity acceleration, for example. In this case, it is possible to generate a particularly large vehicle drive force by using the drive force Fgen of the generator 22, in addition to the force Ftrc of the traction motor 24 and the force Feng of the engine 20, to drive the first electric vehicle 10A. The control pattern PA12 may also be considered as being associated with the ENG travel mode.

Here, the term "low velocity" refers to a range of velocity greater than 0 km/h and less than any velocity between 10 and 20 km/h. Furthermore, the term "medium velocity" refers to a range of velocity greater than the maximum value of the low velocity and less than any velocity between 60 and 120 km/h. Yet further, the term "high velocity" refers to a range of velocity greater than the maximum value of the medium velocity and less than the maximum vehicle velocity of the first electric vehicle 10A.

With the control pattern PA13, the ENG clutch 30, the GEN clutch 32, and the TRC clutch 34 are set to OFF. Due to this, by having the first electric vehicle 10A travel with inertia without the power generation by the generator 22 or the traction motor 24, for example, it is possible to improve the travel efficiency (or actual fuel consumption) of the first electric vehicle 10A.

[A-2-3. Hybrid Travel Mode]

The hybrid travel mode is a mode in which the generator 22 generates electric power according to the force Feng of the engine 20, and the first electric vehicle 10A is driven by the traction motor 24 using this generated electric power. As shown in FIG. 3, the hybrid travel mode is used during medium-velocity acceleration and high-velocity acceleration. The hybrid travel mode includes the control pattern PA21 (rotating electric machine cruise travel mode). With the control pattern PA21, the ENG clutch 30 (COM clutch 30) is set to OFF, and the GEN clutch 32 and TRC clutch 34 are set to ON. In this way, the engine 20 is connected to the generator 22, but is separated from the wheel 36.

[A-2-4. ENG Travel Mode]

The ENG travel mode is a mode in which travel is achieved using the engine 20 as the main drive source. The ENG travel mode is used during high-velocity acceleration, high-velocity cruising, and battery charging, for example. The ENG travel mode includes the control patterns PA31 to PA34.

With the control pattern PA31, the ENG clutch 30 and the TRC clutch 34 are set to be ON, and the GEN clutch 32 is set to be OFF. Due to this, high-velocity acceleration is possible, for example.

With the control pattern PA32, the ENG clutch 30 is set to be ON, and the GEN clutch 32 and TRC clutch 34 are set to be OFF. Due to this, high-velocity cruising is possible, for example. High-velocity cruising may relate to only a portion of the velocity region within the range of velocity greater than the maximum value of the medium velocity and less than the maximum vehicle velocity of the first electric vehicle 10A. In this specification, a case in which the velocity V is constant and a case in which the velocity V fluctuates within a prescribed range are considered to be cruising.

With the control pattern PA33, the ENG clutch 30 and the GEN clutch 32 are set to be ON, and the TRC clutch 34 is set to be OFF. Due to this, charging of the high voltage battery 38, for example, can be performed.

With the control pattern PA34, the ENG clutch 30 and the TRC clutch 34 are set to be OFF, and the GEN clutch 32 is set to be ON. Due to this it is possible to charge the high voltage battery 38 or the like by having the generator 22 generate electric power with the force Feng of the engine 20 when the first electric vehicle 10A is traveling with inertia, for example.

[A-2-5. Regeneration Mode]

The regeneration mode is a mode used when the first electric vehicle 10A decelerates. The regeneration mode includes the control pattern PA41. With the control pattern PA41, the ENG clutch 30 and the GEN clutch 32 are set to be OFF, and the TRC clutch 34 is set to be ON. Due to this, it is possible to charge the high voltage battery 38 or the like by performing regeneration with the traction motor 24.

[Characteristic Configuration of the First Electric Vehicle 10A]

As shown in FIG. 1 and FIG. 2, in the first electric vehicle 10A, a torque sensor 50 is arranged between a switching apparatus (e.g., the third clutch 34) and the wheel 36 in the first transmission path 90. In this first electric vehicle 10A, a torque sensor 50 is arranged on the output shaft 260 (see FIG. 2). The torque sensor 50 is a magnetostrictive torque sensor. Specifically, the torque sensor 50 includes a plurality of magnetostrictive films (not shown in the drawings) formed on the output shaft 260 and a plurality of coils (not shown in the drawings) arranged facing the output shaft 260. As the specific configuration of the torque sensor 50, the configuration described in Japanese Laid-Open Patent Publication No. 2009-264812, for example, can be applied.

Figure 4:
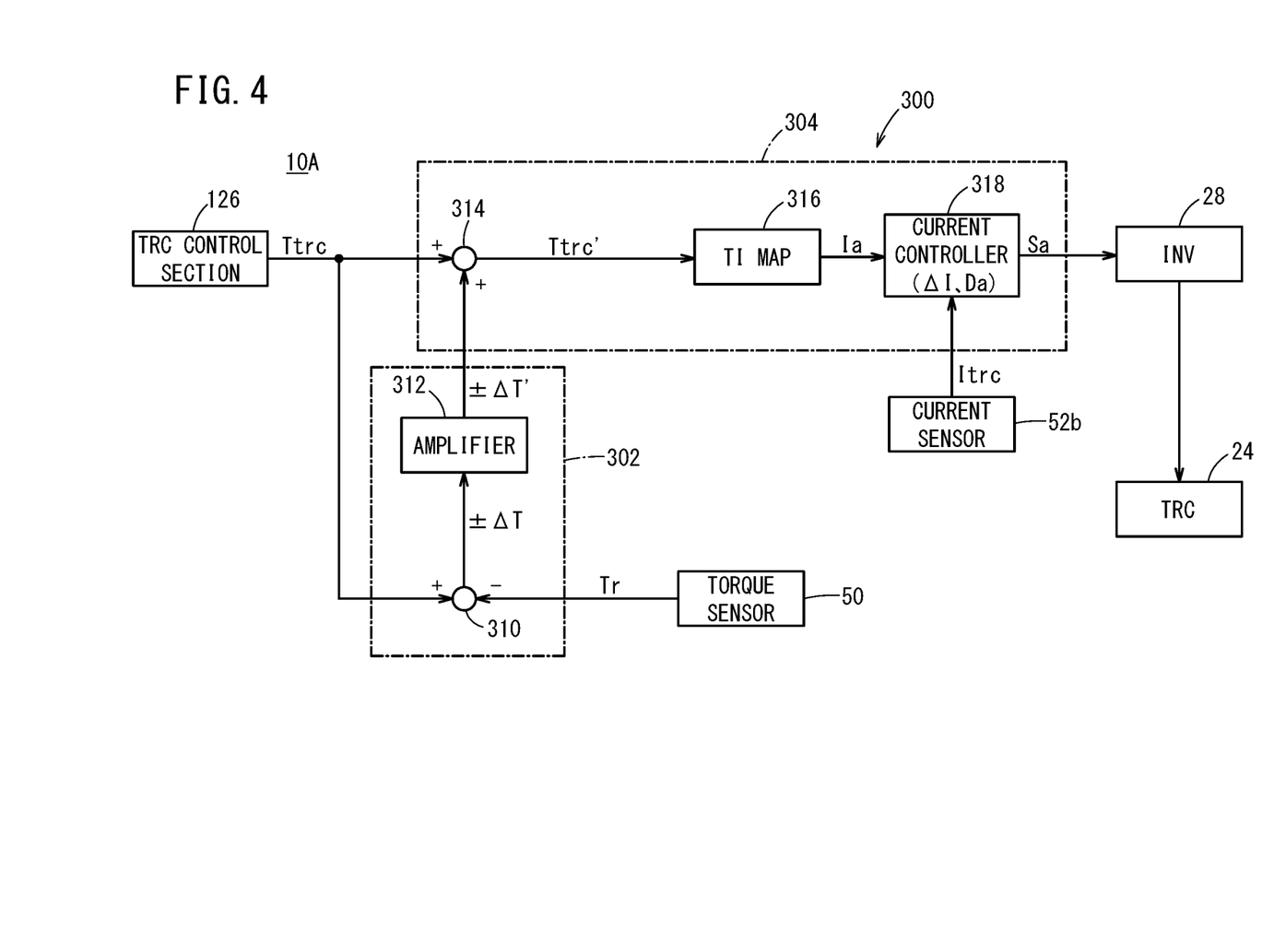
FIG. 4 is a block diagram showing a schematic configuration of the torque ripple suppressing section of the first electric vehicle.

Furthermore, as shown in FIG. 1, the first electric vehicle 10A includes a torque ripple suppressing section (torque ripple suppressing unit) 300 in the electronic control unit (ECU) 60. This torque ripple suppressing section 300 includes a torque ripple component acquiring section (torque ripple component acquiring unit) 302 and a torque correcting section (torque correcting unit) 304, as shown in FIG. 4.

The torque ripple component acquiring section 302 acquires a torque ripple component $\Delta T$ based on the torque (actual torque Tr) detected by the torque sensor 50 and the torque command value Ttrc for the second rotating electric machine 24 from the TRC control section 126. The torque ripple component acquiring section 302 includes, for example, a subtractor 310 that subtracts the actual torque Tr from the torque command value Ttrc and an amplifier 312 that amplifies the value $\Delta T$ (including the sign) from the subtractor 310 to obtain the torque ripple component $\Delta T'$. A P-controller or the like can be used as the amplifier 312, for example.

The torque correcting section 304 suppresses the torque ripple component $\Delta T'$ from the torque command value Ttrc, to correct the torque generated from the second rotating electric machine 24. The torque correcting section 304 includes an adder 314, a torque-current conversion map 316, and a current controller 318. The adder 314 adds together the amplified torque ripple component $\Delta T'$ (including the sign) from the torque ripple component acquiring section 302 and the torque command value Ttrc described above, and outputs the resulting corrected torque command value Ttrc'. The torque-current conversion map 316 stores in advance a relationship between the corrected torque command value Ttrc' and a target current Ia.

The torque-current conversion map 316 then supplies the current controller 318 with the target current Ia corresponding to the corrected torque command value Ttrc' from the adder 314. The current controller 318 calculates a difference $\Delta I$ between the current Itrc (actual current) from the current sensor 52b and the target current Ia from the torque-current conversion map 316. Furthermore, the current controller 318 calculates a target duty ratio Da corresponding to the difference $\Delta I$, and outputs a drive signal Sa corresponding to this target duty ratio Da to the second inverter 28.

The second inverter 28 sets a switching element (not shown in the drawings) inside the second inverter 28 to be ON in response to the drive signal Sa, and supplies the second rotating electric machine 24 (TRC) with the current from the high voltage battery 38 (see FIG. 1). In this way, the torque generated from the second rotating electric machine 24 is output as torque in which the torque ripple component has been suppressed.

The following describes an electric vehicle according to a second embodiment (referred to below as the second electric vehicle 10B), while referencing FIGS. 5 to 7.

Figure 5:
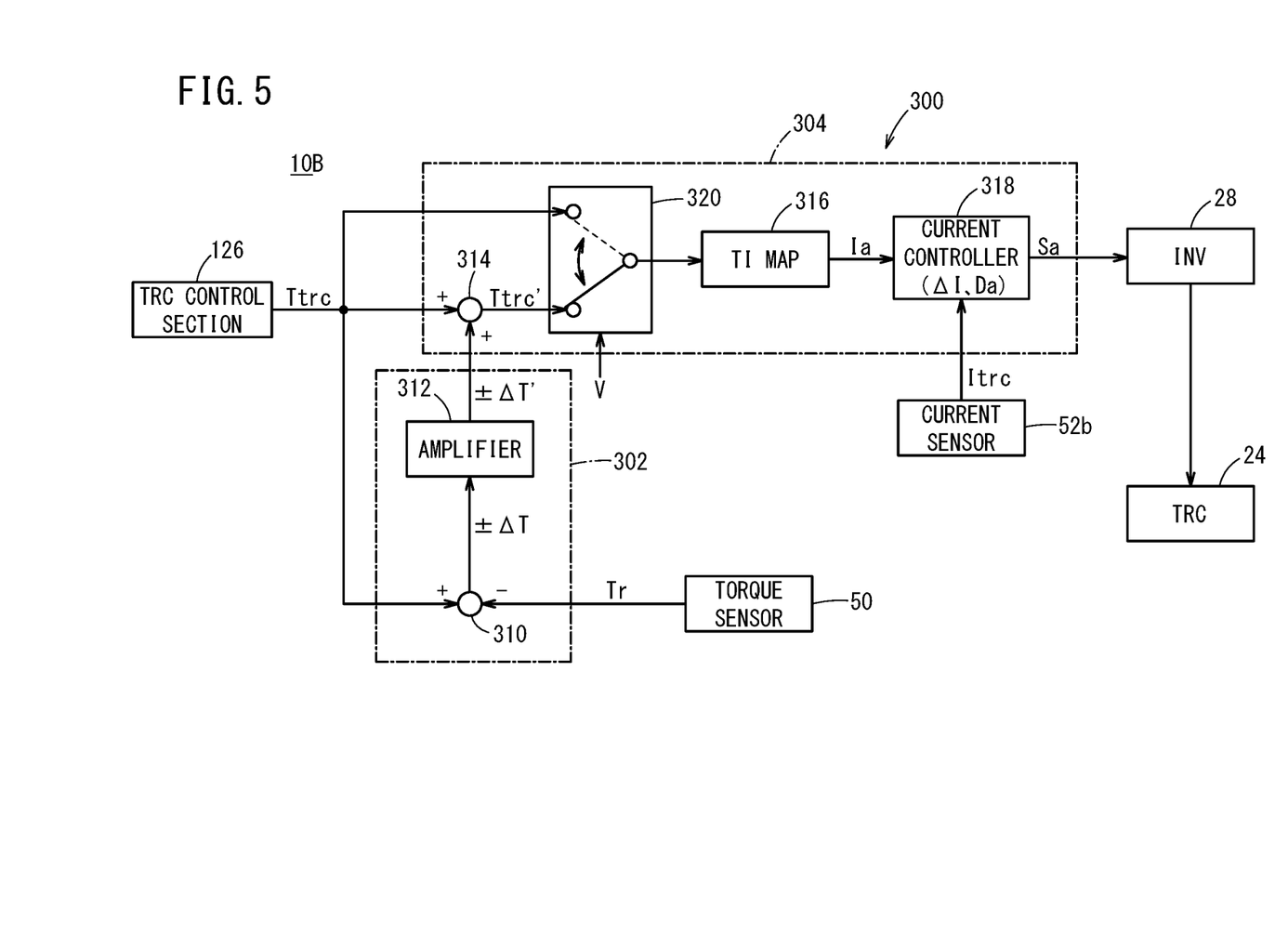
FIG. 5 is a block diagram showing a schematic configuration of the torque ripple suppressing section in an electric vehicle (second electric vehicle) according to the second embodiment.
Figure 6:
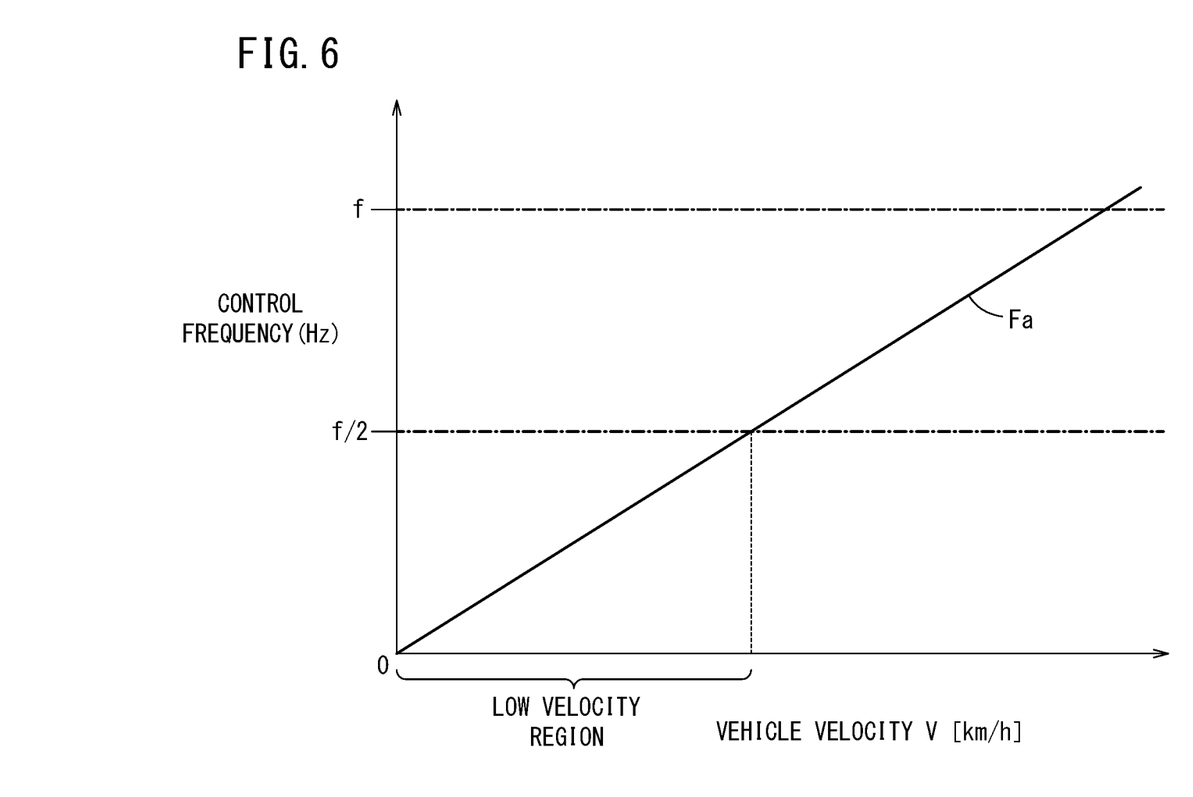
FIG. 6 is a characteristic diagram showing a relationship between the frequency Fa that is an integer-multiple-order wave of the electrical angle of the second rotating electric machine relative to the vehicle velocity and a control frequency f of the second rotating electric machine.

As shown in FIG. 5, the second electric vehicle 10B has almost the same configuration as the first electric vehicle 10A described above, but differs in that a low velocity region determining section 320 is included in the torque ripple suppressing section 300.

The low velocity region determining section 320 determines whether the current velocity V is in a preset low velocity region. As shown in FIG. 6, for example, the low velocity region determining section 320 determines that the current vehicle velocity V is in the low velocity region if the vehicle velocity V satisfies Fa≤f/2, where the frequency of an integer-multiple-order wave of the electrical angle of the second rotating electric machine 24 relative to the vehicle velocity V is Fa and the control frequency of the second rotating electric machine 24 is f. The integer multiple is a multiple of six, for example. Furthermore, the low velocity region is the range of velocity from 0 km/h to less than any velocity from 10 to 20 km/h, for example. Of course, the low velocity region may be suitably changed according to the type of vehicle.

The low velocity region determining section 320 then outputs the corrected torque command value Ttrc' from the adder 314 if the current vehicle velocity V is in the low velocity region, and outputs the torque command value Ttrc from the traction motor control section 126 if the current vehicle velocity V is not in the low velocity region. In other words, the torque correcting section 304 does not perform the torque correction described above if the torque command value Ttrc is output from the low velocity region determining section 320.

Figure 7:
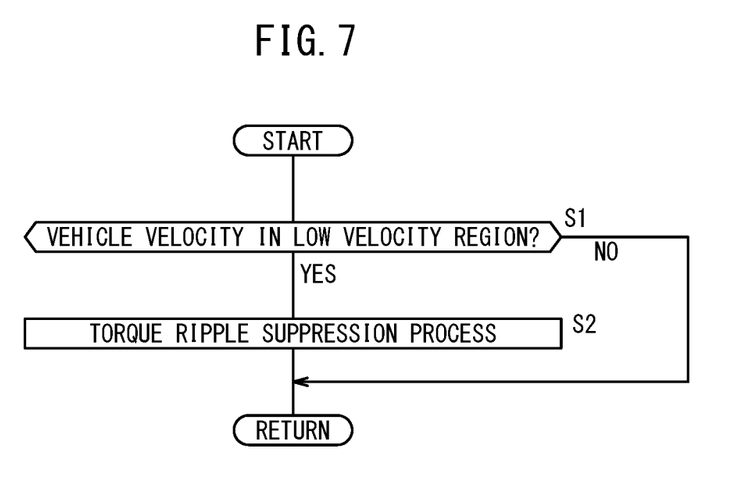
FIG. 7 is a flow chart showing the processing operation of the second electric vehicle.

Here, the processing operations of the second electric vehicle 10B are described while referencing FIG. 7.

First, at step S1 of FIG. 7, the low velocity region determining section 320 determines whether the current vehicle velocity V is in the low velocity region. As described above, this is a determination concerning whether the current vehicle velocity V satisfies Fa≤f/2.

If the vehicle velocity V is in the low velocity region, the process then proceeds to step S2, and the torque ripple suppressing section 300 performs the torque ripple suppression process described above. At step S1, if it is determined that the vehicle velocity V is not in the low velocity region, the torque ripple suppression process described above is not performed. After this, when a prescribed time has passed, the processes of step S1 and onward are repeated.

Figure 8:
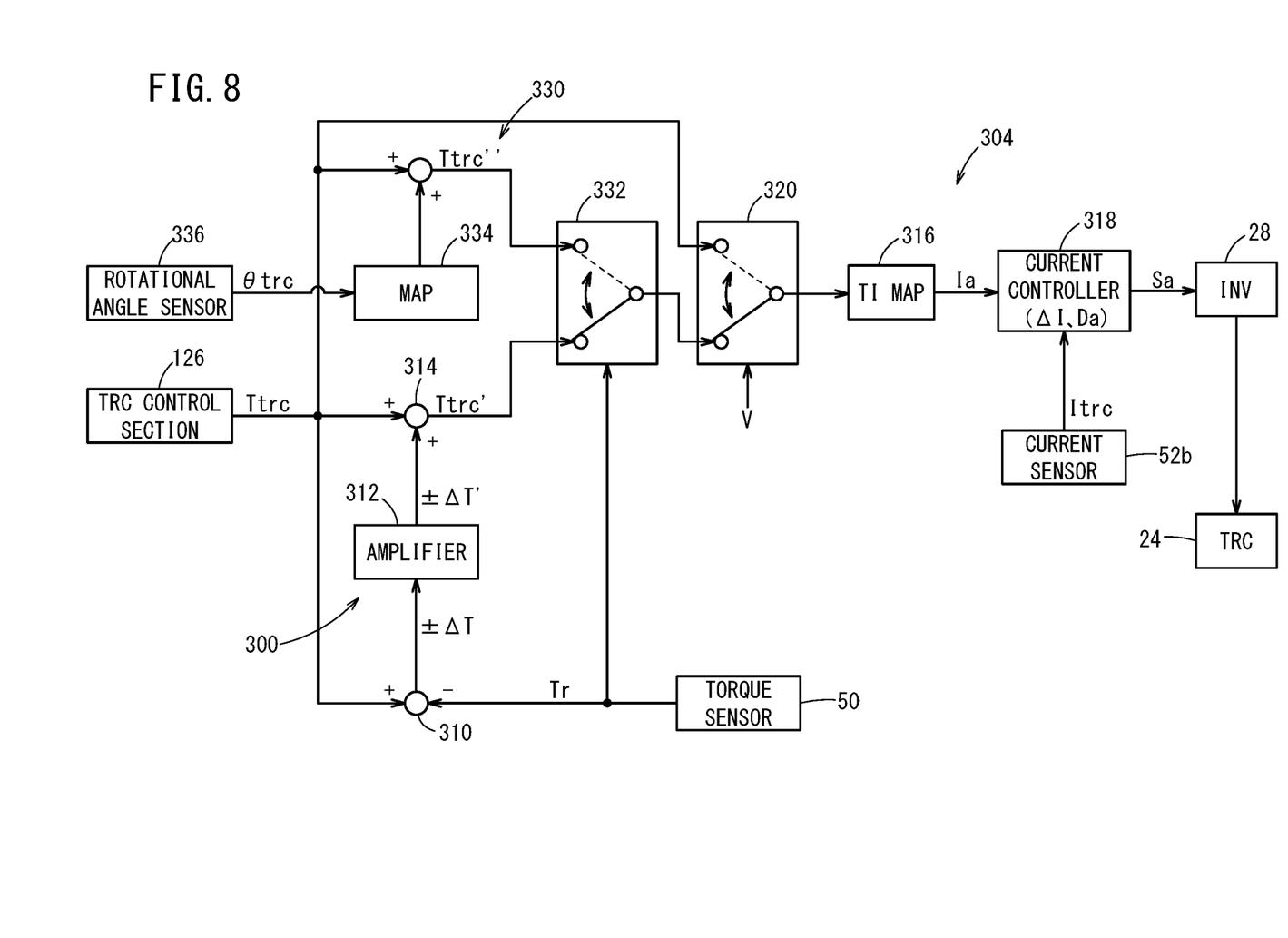
FIG. 8 is a block diagram showing a schematic configuration of the torque ripple suppressing section in an electric vehicle (third electric vehicle) according to the third embodiment.

The following describes an electric vehicle according to a third embodiment (referred to below as the third electric vehicle 10C), while referencing FIGS. 8 and 9.

The third electric vehicle 10C has almost the same configuration as the second electric vehicle 10B described above, but differs by including a preliminary torque ripple suppressing section 330 and an output selecting section (output selecting unit) 332, in addition to the torque ripple suppressing section 300 described above.

The preliminary torque ripple suppressing section 330 uses a map 334 in which corrected torque command values Ttrc'' (predicted values) corresponding to rotational angles θtrc of the second rotating electric machine 24 (drive motor) are registered. The rotational angle θtrc of the second rotating electric machine 24 is detected by a rotational angle sensor 336 such as a resolver, for example.

The output selecting section 332 determines whether the output of the torque sensor 50 is normal, selects the output based on the torque sensor 50 if the output is normal, and selects the output based on the map 334 if the output is not normal. A case where the output is not normal is a case where the output from the torque sensor 50 is constant, a case where the output from the torque sensor 50 falls outside a preset threshold value range, or the like, for example.

The low velocity region determining section 320 outputs the corrected torque command value (Ttrc' or Ttrc'') from the output selecting section 332 if the current vehicle velocity V is in the low velocity region, and outputs the torque command value Ttrc from the traction motor control section 126 if the current vehicle velocity V is not in the low velocity region. In other words, the third electric vehicle 10C does not perform the torque correction described above if the current vehicle velocity V is not in the low velocity region.

Figure 9:
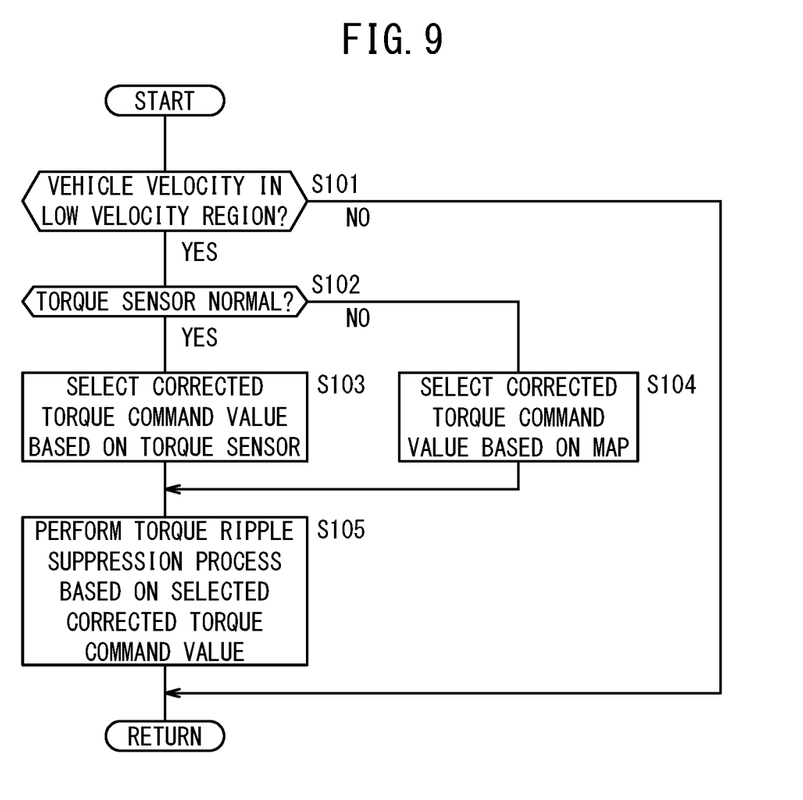
FIG. 9 is a flow chart showing the processing operation of the third electric vehicle.

Here, processing operations of the third electric vehicle 10C are described while referencing FIG. 9.

First, at step S101 of FIG. 9, the low velocity region determining section 320 determines whether the current vehicle velocity V is in the low velocity region. As described above, this is a determination concerning whether the current vehicle velocity V satisfies Fa≤f/2.

If the vehicle velocity V is in the low velocity region, the process then proceeds to step S102, and the output selecting section 332 determines whether the torque sensor 50 is normal. If the torque sensor 50 is normal, the process then proceeds to step S103, and the output selecting section 332 selects the corrected torque command value Ttrc' based on the torque sensor 50. If the torque sensor 50 is not normal, the process proceeds to step S104, and the output selecting section 332 selects the corrected torque command value Ttrc'' based on the map 334.

Next, at step S105, the torque ripple suppression process is performed based on the output of the corrected torque command value (Ttrc' or Ttrc'') selected by the output selecting section 332.

On the other hand, at step S101, if it is determined that the vehicle velocity V is not in the low velocity region, the torque ripple suppression process described above is not performed. After this, when a prescribed time has passed, the processes of step S101 and onward are repeated.

<A-3. Effects of the Present Embodiment>

In this way, the electric vehicle according to the present embodiment comprises a second rotating electric machine 24; a first transmission path 90 configured to transmit force generated by the second rotating electric machine 24 to a wheel 36; a first clutch 30 that is arranged in the first transmission path 90 and switches between a connected state and a disconnected state between the second rotating electric machine 24 and the wheel 36; and an ECU 60 configured to control the second rotating electric machine 24 and the first clutch 30, wherein a torque sensor 50 is arranged between the first clutch 30 and the wheel 36 in the first transmission path 90.

In this way, it is possible to acquire the torque occurring between the first clutch 30 and the wheel 36 (e.g. in the output shaft 260) in the first transmission path 90, directly through the torque sensor 50, and therefore the torque transmitted to the wheel 36 can be controlled to be constant and smooth creeping travel (travel at a constant velocity), for example, can be realized.

The present embodiment further comprises a torque ripple suppressing section 300, and the torque ripple suppressing section 300 includes a torque ripple component acquiring section 302 configured to acquire a torque ripple component ΔT based on a torque command value Ttrc for the second rotating electric machine 24 and an actual torque Tr detected by the torque sensor 50; and a torque correcting section 304 configured to correct the torque generated from the second rotating electric machine 24 by suppressing the torque ripple component ΔT from the torque command value Ttrc.

There is no need to use a high frequency superimposition map or the like to predict the torque ripple according to the rotational angle of the second rotating electric machine 24, and therefore it is possible to simplify the configuration and to simplify the information processing. Furthermore, it is possible to correct deviation of the torque due to angle errors of the second rotating electric machine 24, based on the zero-point adjustment error or the like of the second rotating electric machine 24, for example. Yet further, it is possible to suppress deviation of the high-frequency superimposition map described above due to the temperature characteristics of the second rotating electric machine 24.

In addition, by detecting torsional vibration caused by the input from the wheel 36 with the torque sensor 50, it is possible to correct the torque generated from the second rotating electric machine 24 such that the torsional vibrational component is also suppressed along with the torque ripple component.

In the present embodiment, the torque ripple suppressing section 300 further includes a map 334 in which torque ripple components corresponding to rotational angles of the second rotating electric machine 24 are registered; and an output selecting section 332 configured to select between an output based on the torque sensor 50 and an output based on the map 334.

As an example, when the torque sensor 50 is normal, the output based on the torque sensor 50 is selected by the output selecting section 332, and when the torque sensor 50 is not normal due to a malfunction or the like, the output based on the map 334 is selected by the output selecting section 332. As described above, in the output based on the map 334, there is a concern about torque deviation due to an angular error of the second rotating electric machine 24 or torque deviation due to the temperature characteristics of the second rotating electric machine 24, but it is possible for this output to function as a failsafe while the malfunctioning torque sensor 50 is being replaced with a normal torque sensor 50.

In the present embodiment, the torque ripple suppressing section 300 operates when vehicle velocity V is in a low velocity region. Since high frequencies are easily attenuated, it is unlikely that the driver or passenger will feel these frequencies, but low frequencies are easily transmitted to the driver or passenger. Accordingly, the angular frequency of the second rotating electric machine 24 becomes high when the vehicle velocity V is in a high velocity region, and therefore vibration, sound, and the like of the second rotating electric machine 24 is unlikely to be transmitted to the driver or passenger. Since the angular frequency of the second rotating electric machine 24 becomes low when the vehicle velocity V is in the low velocity region, it becomes easier for the vibration, sound, and the like of the second rotating electric machine 24 to be transmitted to the driver or passenger. Therefore, by having the torque ripple suppressing section 300 operate when the vehicle velocity V is in the low velocity region, it is possible to realize smooth creeping travel (travel at a constant velocity) and also to make the signal processing and information processing more efficient, since the torque ripple suppressing section 300 no longer needs to operate constantly.

In the present embodiment, the torque ripple suppressing section 300 operates when vehicle velocity satisfies $Fa \leq f/2$, where Fa is a frequency of an integer-multiple-order wave of an electrical angle of the second rotating electric machine 24 relative to the vehicle velocity V and f is a control frequency of the second rotating electric machine 24.

By having the torque ripple suppressing section 300 operate when the vehicle velocity V is in the low velocity region, i.e., when the vehicle velocity V satisfies $Fa \leq f/2$, it is possible to realize smooth creeping travel (travel at a constant velocity) and also to make the signal processing and information processing more efficient, since the torque ripple suppressing section 300 no longer needs to operate constantly.

B. Modifications

The present invention is not limited to the embodiments described above, and it is obvious that various configurations can be adopted based on the content recorded in this Specification. For example, the configuration described below can be adopted.

<B-1. Applicable Target>

The electric vehicle according to the present embodiment is configured to transmit drive force from the second rotating electric machine 24 to the output shaft 260, but may selectively adopt a configuration to transmit drive force from the first rotating electric machine 22 to the output shaft 260. In this case, the torque command value issued to the first rotating electric machine 22 from the GEN control section 124 may be corrected.

<B-2. Rotating Electric Machines>

The first rotating electric machine 22 and the second rotating electric machine 24 of the present embodiment are each three-phase AC brushless types. However, from the viewpoint of correcting the torque command value for the first rotating electric machine 22 or the second rotating electric machine 24, the rotating electric machines are not limited to these types. The first rotating electric machine 22 and the second rotating electric machine 24 may be DC (direct current) types or brush types.

The first rotating electric machine 22 and the second rotating electric machine 24 of the present embodiment are each an interior permanent magnet synchronous motor (IP-MSM). However, from the viewpoint of correcting the torque command value for the first rotating electric machine 22 or the second rotating electric machine 24, for example, the rotating electric machines are not limited to these types. The first rotating electric machine 22 and the second rotating electric machine 24 may be other types of rotating electric machines.

<B-3. Clutches>

In the present embodiment, the first to third clutches 30, 32, and 34 are provided (see FIG. 1). However, from the viewpoint of correcting the torque command value for the first rotating electric machine 22 or the second rotating electric machine 24, for example, the present invention is not limited to this. As an example, the second clutch 32 or the third clutch 34 can be omitted.

<B-4. Torque Sensor 50>

In the present embodiment, the torque sensor 50 is a magnetostrictive type. However, from the viewpoint of correcting the torque command value for the first rotating electric machine 22 or the second rotating electric machine 24, for example, the torque sensor 50 is not limited to this. As an example, the torque sensor 50 can use another type of detection.

What is claimed is:

1. An electric vehicle comprising:
   at least one drive motor that provides a drive force to a wheel;
   a transmission path including a plurality of shafts, a plurality of gears, and one or more clutches that transmit the drive force generated by the at least one drive motor to the wheel, with the one or more clutches serving as a switching apparatus that is arranged in the transmission path and configured to switch between a connected state and a disconnected state between the at least one drive motor and the wheel; and
   a control apparatus including one or more processors that control the at least one drive motor and the switching apparatus, wherein
   a torque sensor is arranged between the switching apparatus and the wheel in the transmission path,
   wherein the one or more processors of the control apparatus function as a torque ripple suppressing unit that:
   acquires a torque ripple component based on a torque command value for the at least one drive motor and a torque detected by the torque sensor; and
   corrects the torque generated from the at least one drive motor by suppressing the torque ripple component from the torque command value.

2. The electric vehicle according to claim 1, wherein the torque ripple suppressing unit operates when vehicle velocity is in a low velocity region.

3. The electric vehicle according to claim 2, wherein the torque ripple suppressing unit operates when vehicle velocity is in a low velocity region.

4. The electric vehicle according to claim 3, wherein the torque ripple suppressing unit operates when vehicle velocity satisfies $Fa \leq f/2$, where Fa is a frequency of an integer-multiple-order wave of an electrical angle of the at least one drive motor relative to the vehicle velocity and f is a control frequency of the at least one drive motor.

5. The electric vehicle according to claim 1, wherein the torque ripple suppressing unit operates when vehicle velocity satisfies $Fa \leq f/2$, where Fa is a frequency of an integer-multiple-order wave of an electrical angle of the at least one drive motor relative to the vehicle velocity and f is a control frequency of the at least one drive motor.

6. The electric vehicle according to claim 3, wherein the torque ripple suppressing unit further includes:
   a map in which torque ripple components corresponding to rotational angles of the at least one drive motor are registered; and
   an output selecting unit configured to select between an output based on the torque sensor and an output based on the map.

7. The electric vehicle according to claim 1, wherein the torque ripple suppressing unit acquires the torque ripple component by:
   subtracting the torque from the torque command value; and
   amplifying a result of the subtracting.

8. The electric vehicle according to claim 1, wherein the torque suppressing unit corrects the torque by:
   adding together the torque ripple component and the torque command value, and outputting a resulting corrected torque command value;
   storing in advance a relationship between the corrected torque command value and a target current in a torque current conversion map, and outputting the target current corresponding to the corrected torque command value from the adding; and
   outputting a drive signal to an inverter configured to rotationally drive the at least one drive motor, and
   the outputting of the drive signal includes calculating a target duty ratio corresponding to a difference between a current flowing between the at least one drive motor and the inverter and the target current from the torque-current conversion map, and outputting the drive signal corresponding to the target duty ratio to the inverter.

* * * * *

UNITED STATES PATENT AND TRADEMARK OFFICE
CERTIFICATE OF CORRECTION

PATENT NO.         : 11,097,722 B2
APPLICATION NO.    : 16/283310
DATED              : August 24, 2021
INVENTOR(S)        : Hoshino et al.

It is certified that error appears in the above-identified patent and that said Letters Patent is hereby corrected as shown below:

In the Claims

Replace Column 15, Line 5-Column 16, Line 40, (approx.) with:
1. An electric vehicle comprising:
    at least one drive motor that provides a drive force to a wheel;
a transmission path including a plurality of shafts, a plurality of gears, and one or more clutches that transmit the drive force generated by the at least one drive motor to the wheel, with the one or more clutches serving as a switching apparatus that is arranged in the transmission path and configured to switch between a connected state and a disconnected state between the at least one drive motor and the wheel; and
    a control apparatus including one or more processors that control the at least one drive motor and the switching apparatus, wherein
    a torque sensor is arranged between the switching apparatus and the wheel in the transmission path,
    wherein the one or more processors of the control apparatus function as a torque ripple suppressing unit that:
    acquires a torque ripple component based on a torque command value for the at least one drive motor and a torque detected by the torque sensor; and
    corrects the torque generated from the at least one drive motor by suppressing the torque ripple component from the torque command value.

2. The electric vehicle according to claim 1, wherein
    the torque ripple suppressing unit operates when vehicle velocity is in a low velocity region.

3. The electric vehicle according to claim 1, wherein
    the torque ripple suppressing unit operates when vehicle velocity satisfies $Fa \leq f/2$, where $Fa$ is a frequency of an integer-multiple-order wave of an electrical angle of the at least one drive motor relative to the vehicle velocity and $f$ is a control frequency of the at least one drive motor.

Signed and Sealed this
Twenty-seventh Day of September, 2022

*Katherine Kelly Vidal*

Katherine Kelly Vidal
*Director of the United States Patent and Trademark Office*

4. The electric vehicle according to claim 1, wherein the torque ripple suppressing unit further includes:

a map in which torque ripple components corresponding to rotational angles of the at least one drive motor are registered; and an output selecting unit configured to select between an output based on the torque sensor and an output based on the map.

5. The electric vehicle according to claim 4, wherein the torque ripple suppressing unit operates when vehicle velocity is in a low velocity region.

6. The electric vehicle according to claim 4, wherein the torque ripple suppressing unit operates when vehicle velocity satisfies $Fa \leq f/2$, where $Fa$ is a frequency of an integer-multiple-order wave of an electrical angle of the at least one drive motor relative to the vehicle velocity and $f$ is a control frequency of the at least one drive motor.

7. The electric vehicle according to claim 1, wherein the torque ripple suppressing unit acquires the torque ripple component by:

subtracting the torque from the torque command value; and amplifying a result of the subtracting.

8. The electric vehicle according to claim 1, wherein the torque suppressing unit corrects the torque by:

adding together the torque ripple component and the torque command value, and outputting a resulting corrected torque command value;

storing in advance a relationship between the corrected torque command value and a target current in a torque current conversion map, and outputting the target current corresponding to the corrected torque command value from the adding; and outputting a drive signal to an inverter configured to rotationally drive the at least one drive motor, and the outputting of the drive signal includes calculating a target duty ratio corresponding to a difference between a current flowing between the at least one drive motor and the inverter and the target current from the torque-current conversion map, and outputting the drive signal corresponding to the target duty ratio to the inverter.